(12) United States Patent
Padwad et al.

(10) Patent No.: US 11,687,559 B1
(45) Date of Patent: Jun. 27, 2023

(54) COMPUTER SYSTEMS AND METHODS FOR RECONCILING DATA ACROSS DATA SOURCES

(71) Applicant: Morgan Stanley Services Group, Inc., New York, NY (US)

(72) Inventors: Prasad Padwad, Pune (IN); Arpan Kapoor, Mumbai (IN); Tanay Machale, Nagpur (IN); Sachin Deep, Mumbai (IN)

(73) Assignee: Morgan Stanley Services Group, Inc., New York, NY (US)

( * ) Notice: Subject to any disclaimer, the term of this patent is extended or adjusted under 35 U.S.C. 154(b) by 0 days.

(21) Appl. No.: 17/342,892

(22) Filed: Jun. 9, 2021

(51) Int. Cl.
| | | |
|---|---|---|
| *G06F 16/27* | (2019.01) | |
| *G06F 16/2455* | (2019.01) | |
| *G06F 11/30* | (2006.01) | |
| *G06F 16/25* | (2019.01) | |
| *G06F 16/21* | (2019.01) | |
| *G06F 16/23* | (2019.01) | |
| *G06F 16/178* | (2019.01) | |

(52) U.S. Cl.
CPC .......... *G06F 16/27* (2019.01); *G06F 11/3086* (2013.01); *G06F 16/1794* (2019.01); *G06F 16/21* (2019.01); *G06F 16/2365* (2019.01); *G06F 16/24558* (2019.01); *G06F 16/258* (2019.01); *G06F 16/275* (2019.01); *G06F 16/278* (2019.01)

(58) Field of Classification Search
CPC .... G06F 16/27; G06F 16/21; G06F 16/24558; G06F 16/258; G06F 16/2365; G06F 11/3086; G06F 16/275; G06F 16/273; G06F 16/278; G06F 16/1794
See application file for complete search history.

(56) References Cited

U.S. PATENT DOCUMENTS

| | | |
|---|---|---|
| 9,009,175 B2 | 4/2015 | Sitt |
| 9,047,334 B1 | 6/2015 | Cheriton |

(Continued)

*Primary Examiner* — Alford W Kindred
*Assistant Examiner* — Lin Lin M Htay
(74) *Attorney, Agent, or Firm* — K&L Gates LLP

(57) ABSTRACT

Computer system compares data across two data sources. Database connectivity drivers access the first and second data sources. RAM receives and stores data from each of the first and second data sources accessed by the drivers. The data from the first data source are stored in a first table in the RAM and data from the second data source are stored in a second table in the RAM. A processor compares data in the first and second tables. The processor is programmed to compare the data by identifying a set of primary keys across the first and second tables. The set of primary keys are a set of one or more columns in the both first and second tables that uniquely identify rows across both the first and second tables. The processor then compares the data in the first and second tables, which comparison can include: determining, based on the identified set of primary keys, a total number of mismatched cell values across the first and second tables; and computing a score for the comparison of the first and second tables, where the score is computed based on the total number of mismatched cell values. The computer system can then generate an electronic comparison report based on the comparing of the first table and second table.

18 Claims, 6 Drawing Sheets

(56) References Cited

U.S. PATENT DOCUMENTS

| | | | |
|---|---|---|---|
| 9,390,132 B1* | 7/2016 | Kapoor | G06F 16/24564 |
| 2004/0267809 A1 | 12/2004 | East et al. | |
| 2007/0088733 A1 | 4/2007 | Bodge et al. | |
| 2011/0264625 A1* | 10/2011 | Samudrala | G06F 16/25 |
| | | | 707/723 |
| 2013/0124474 A1* | 5/2013 | Anderson | G06F 16/20 |
| | | | 707/634 |
| 2013/0238596 A1* | 9/2013 | Mandelstein | G06F 16/254 |
| | | | 707/716 |
| 2015/0193719 A1 | 7/2015 | Atkinson et al. | |
| 2015/0278347 A1 | 10/2015 | Gaertner et al. | |
| 2019/0155801 A1* | 5/2019 | Karunanithi | G06F 11/30 |
| 2021/0200744 A1* | 7/2021 | Gubba | G06F 16/258 |

* cited by examiner

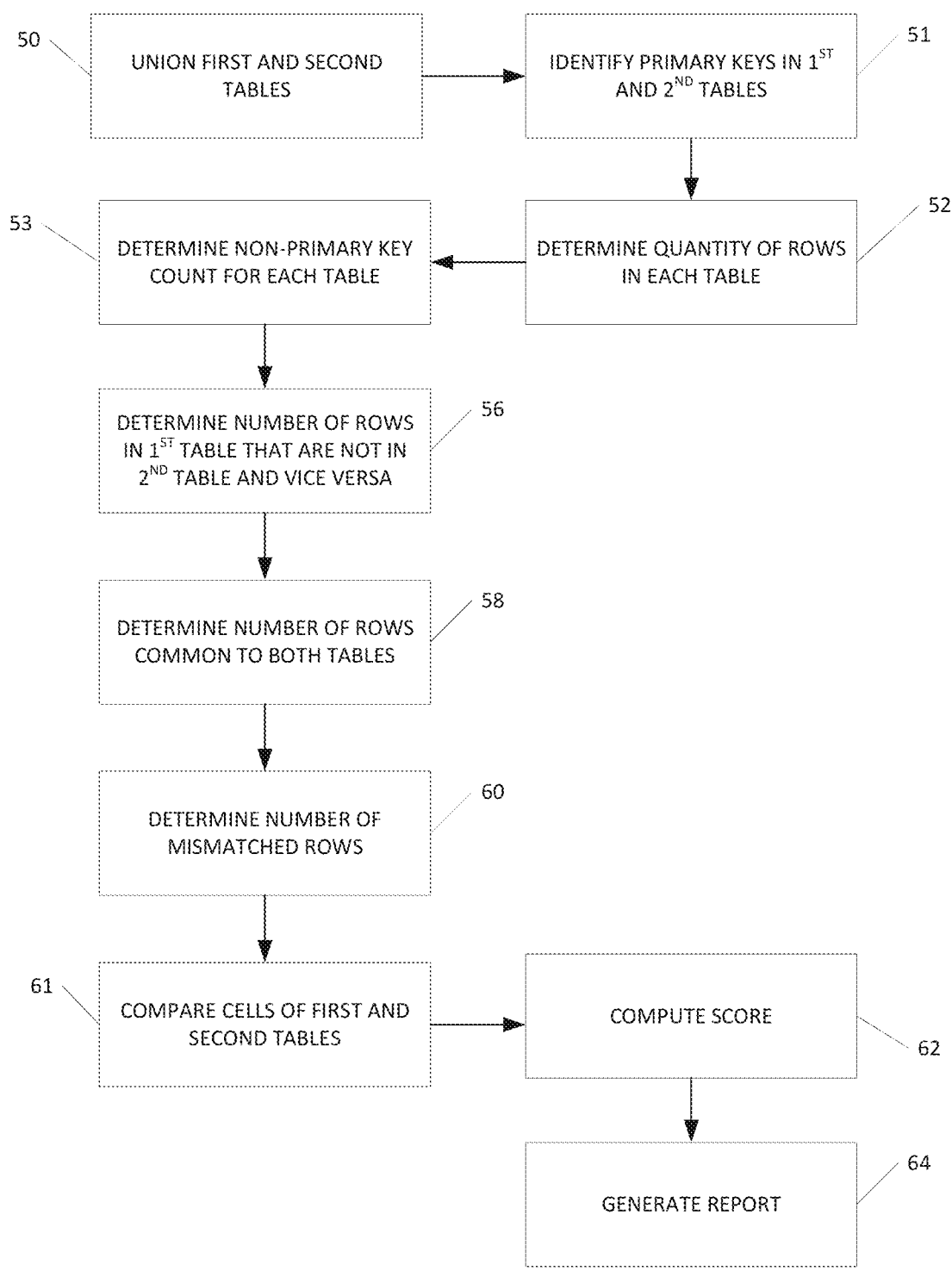

1st Table Path:
2nd Table Path:
Ignored Columns: None
Total time taken for comparison (min:secs): 01:01

Rows in 1st Table: 99
Rows in 2nd Table: 99

Date: 2020.11.12 T04:16:32.551
Pass Percentage: 96.9697
First Table File Path:
Second Table File Path:
Number of rows unique to 1st Table: 0
Number of rows unique to 2nd Table: 0
Number of mismatched rows: 3
Number of common rows: 96

33

31

Mismatch Report: Displaying only rows that failed. The values displayed are from the [First Table, Second Table]

| Attribute 1 | Attribute 2 | Attribute 3 | Attribute 4 |
|---|---|---|---|
| 1150636804 | 12345 | 2019-02-10 | [1940, 19400] |
| 1150636962 | 23456 | 2019-02-10 | [2790, 27900] |
| 1201689196 | 34567 | 2019-02-10 | [149.51, 149.61] |

| Attribute 1 (Primary Key) | Attribute 2 | Attribute 3 | Attribute 4 |
|---|---|---|---|
| 1150636804 | 12345 | 2019-02-10 | 1960 |
| 1150636804 | 12345 | 2019-02-10 | 196000 |

Figure 4A

| Attribute 1 (Primary Key) | Attribute 2 | Attribute 3 | Attribute 4 |
|---|---|---|---|
| 1150636804 | 12345 | 2019-02-10 | 1960 |
| 1150636804 | 12345 | 2019-02-12 | 196000 |

Figure 4B

Data Comparison Summary Report

| Test Description | |
|---|---|
| Config file | \<Compare script\> --leftFile\<Location of left file\> --rightFile\<Location of right file\> -k\<Primary keys\> -o\<Location for output\> |
| No. of tests | 25 |
| Pass | 6 |
| Fail | 19 |
| Average Pass Percent | 97.495 |
| Execution time | 0:13:19 |

Test Summary

| Test Number | Description | Execution Time | Status | Left Row Count | Right Row Count | In Left Only | In Right Only | Common Rows | Mismatch Rows | Pass % | Error message (if any) |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

Figure 6

COMPUTER SYSTEMS AND METHODS FOR RECONCILING DATA ACROSS DATA SOURCES

BACKGROUND

For various reasons, organizations commonly need to migrate large data sources from one platform to another. The migrated data need to be reconciled to assess whether the new data platform will work as required. Presently, reconciling large data migrations is a time-intensive process.

SUMMARY

In one general aspect, the present invention is directed to a computer system that compares data across two data sources. Such a data reconciliation computer system can be used when data are migrated from a first data source to a second data source to ensure or verify that the second data source is ready for production use. The data sources can be of the same type or different types. For example, the data reconciliation computer can compare data sources in the same database management system (DBMS) or two data sources stored in the same type of DBMS. The data reconciliation computer system can also compare data sources that are stored across two different types of DBMSs.

The data reconciliation computer can perform the data reconciliation very quickly, in part due to storing the tables from the data sources in local random access memory (RAM). For example, millions of rows can be compared in a matter of minutes.

According to various embodiments, the data reconciliation computer system comprises one or more database connectivity (DBC) drivers for accessing the first and second data sources. It may also comprise RAM that receives and stores data from each of the first and second data sources accessed by the one or more DBC drivers. The data from the first data source are stored in a first table in the RAM and data from the second data source are stored in a second table in the RAM. The system also comprises a processor in communication with the RAM such that the processor compares data in the first and second tables. The processor is programmed to compare the data by identifying a set of primary keys across the first and second tables. The set of primary keys are a set of one or more columns in the both first and second tables that uniquely identify rows across both the first and second tables. The processor then compares the data in the first and second tables, which comparison can include: determining, based on the identified set of primary keys, a total number of mismatched cell values across the first and second tables; and computing a score for the comparison of the first and second tables, where the score is computed based on the total number of mismatched cell values. The computer system can then generate an electronic comparison report based on the comparing of the first table and second table.

These and other benefits that can be realized through embodiments of the present invention will be apparent from the description that follows.

FIGURES

Various embodiments of the present invention are described herein by way of example in connection with the following figures.

FIG. 2 is flow chart of a process flow performed by the data reconciliation computer system according to various embodiments of the present invention.

FIG. 3 depicts an example summary report generated by the data reconciliation computer system according to various embodiments of the present invention.

FIGS. 4A and 4B depict rows of table to show how to compute mismatched cells according to various embodiments of the present invention.

FIG. 6 depicts an example summary report for a batch comparison according to various embodiments of the present invention.

DESCRIPTION

Figure 1:
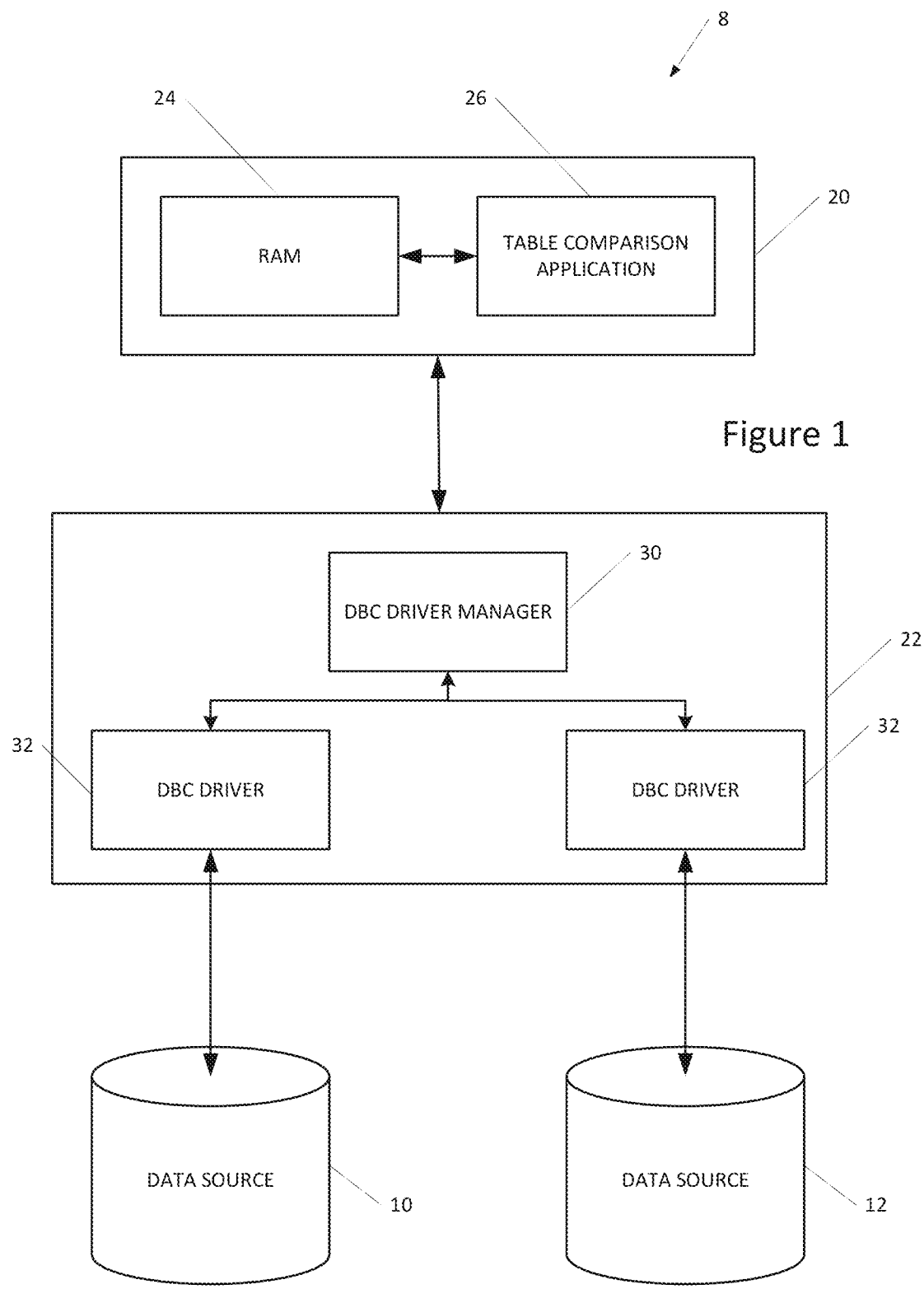
FIG. 1 is a diagram of a data reconciliation computer system according to various embodiments of the present invention.

Various embodiments of the present invention are directed to computer systems and computer-implemented methods for reconciling or comparing data across two data sources. FIG. 1 is a diagram of a data reconciliation computer system 8 according to various embodiments of the present invention. In the illustrated embodiment, data may have been migrated from a first data source 10 to a second data source 12. The data reconciliation computer system 10 can be used to confirm or verify that the data were migrated accurately, e.g., to a desired level of accuracy, so that applications using the data can access the second data source 12 post-migration. The comparison/reconciliation is preferably performed at the cell level of the two data sources/tables as explained below so that the comparison/reconciliation is more reliable and meaningful. Also, the data reconciliation techniques described herein operate very rapidly. Tests show that over one million rows of the tables can be compared in about one minute.

Before describing how the data reconciliation computer system 8 performs the data reconciliation, types of data sources 10, 12 that can be used with the data reconciliation computer system 8 are described. To that end, the data reconciliation computer system 8 can reconcile data across a variety of different data sources such as, databases of or in database management systems (DBMS) or a file system. For example, the data sources 10, 12 could comprise: a SQL relational database; a Hive database; an Impala database; a Greenplum database; a Sybase database; or a DB2 database. A SQL database is a relational database that uses SQL. A Hive database is an ETL (extract, transform, load) and data warehouse tool on top of a Hadoop ecosystem and used for processing structured and semi structured data. An Impala database is an open source massively parallel processing SQL query engine for data stored in a computer cluster running Apache. Greenplum is a big data technology based on a Massively Parallel Processing (MPP) architecture and the Postgres open source database technology. DB2 is a Relational Database Management System (RDBMS) product from IBM. The data reconciliation computer system 8 can also compare data tables stored in the same type of DBMS or in the same DBMS, such as comparing/reconciling tables in two Sybase databases in two different Sybase DMBSs or two Sybase databases in the same Sybase DBMS; two different DB2 databases in two different DB2 DBMSs or two DB2 databases in the same DB2 DBMS; etc.

The data sources 10, 12 could also comprise, for example, delimited text files, such as CSV data files, PSV data files, TSV data files, gz files, or any other suitable data file. Thus, the system 8 could be used to compare two delimited data files (whether or not using the same file format) or to compare a delimited data file to a database in a DBMS.

As shown in FIG. 1, the data reconciliation computer system 8 may comprise, for example, a back-end computer system 20 for performing the data reconciliation and a database connectivity (DBC) server 22 that provides an interface between the back-end computer system 20 and the data sources 10, 20. The back-end computer system 20 preferably accesses the data stored at the data sources 10, 12 via the DBC server 22 and stores the data locally in random access memory (RAM) 24 of the back-end computer system 20. To that end, for reconciliation of large data sources, the back-end computer system 20 may comprise large amounts of RAM 24, such as hundreds of gigabytes or several terabytes. Storing the data to be reconciled locally in the RAM 24 facilitates the data reconciliation computer system 8 being able to compare and reconcile large data sources rapidly, such as tables having millions of rows in a matter of minutes. A parser of the back-end computer system can load the data from each source 10, 12 respectively into the RAM 24 in batches until all rows/records of the data sources 10, 12 are exhausted.

The back-end computer system 20 may also comprise, as shown in FIG. 1, a table comparison application 26 for performing the data comparisons, as described in more detail herein. The table comparison application 26 may be implemented as a software program that is stored in memory of the back-end computer system 20 and executed by a processor(s) of the back-end computer system 20. The back-end computer system 20 may be implemented with a single computer device, such as a workstation, laptop, PC, etc. The back-end computer system 20 could also be implemented with several networked computer devices, which may be networked via Ethernet, a LAN, etc.

The DBC server 22 can connect the back-end computer system 20 to the data sources 10, 20. In various embodiments, the DBC server 22 can employ the Open Database Connectivity (ODBC) standard, which is a DBMS-independent standard application programming interface for accessing DBMSs and/or delimited data files (e.g., the data sources 10, 20). The DBC server 22 can comprise a DBC driver manager 30 and DBC drivers 32. The DBC drivers 32 can act as translation layers between the table comparison application 26 of the back-end computer system 20 and the associated data sources 10, 20 for the DBC drivers 32. The DBC drivers 32 may be specific to the type of data source they access. Thus, for a data reconciliation computer system 8 that is versatile to perform the data reconciliation across a variety of DBMS types, the DBC server 22 can have a driver 32 for each applicable DBMS type (e.g., SQL, Sybase, DBS, Greenplum, Impala, etc.).

The table comparison application 26 can use ODBC functions through the DBC driver manager 30, with which the back-end computer system 20 is linked via an application programing interface (API), and the driver manage 30 can passes queries from the back-end computer system 20 to the corresponding data sources 10, 20 via the drivers 32. To that end, the table comparison application 26 can be considered an ODBC-compliant application.

After the data to be reconciled are retrieved from the respective data sources 10, 12 and stored in the RAM 24, the back-end computer system 20, by executing the table comparison application 26, can compare the data from the two data sources 10, 12 and, for example, compute a score for how closely they compare. The back-end computer system 20 can comprise a high-speed data bus to connect the RAM 24 to the processor(s) of the back-end computer system 20. The data bus may be, for example, a 8-, 16- or 32-bit bus. The CPU of the back-end computer system may will have a cache (L1/L2) on chip for faster memory access before accessing the RAM 24 through a memory controller.

Assuming that the data are migrated from the first data source 10 to the second data source 12, where the first data source 10 was used for production purposes prior to the migration, the score can indicate whether the second data source 12 is ready for production purposes. A higher score (e.g., above a threshold) can indicate whether the second data source 12 is ready for production purposes, whereas a score (e.g., below the threshold) indicates that it is not ready.

FIG. 2 is a flow chart of a process flow performed by the back-end computer system 20, by executing the table comparison application 26, to compare/reconcile the data across the two sources 10, 12 according to various embodiments of the present invention. For purposes of this description, assume that data from the first data source 10 are stored in a first table in the RAM 24 and data from the second data source are stored in a second table in the RAM 24. The illustrated process commences as step 50, where the back-end computer system 20 combines, e.g., unions the first and second tables. Unioning of the two tables can involve having the rows of the first table consume a first set of rows in the combined table and having the rows of the second table consume a second set of rows in the combined table. Next, at step 51, the back-end computer system 20 identifies primary keys across the two tables (within the combined table). In the context of a relational database, a primary key is a minimal set of attributes (e.g., columns in the table) that uniquely identify a tuple or record (e.g., row of the table). Thus, at step 51, the back-end computer system 51 identifies the primary keys that uniquely identify rows of the combined table. Presumably the two tables being compared are somewhat similar so that there is a set of primary keys that uniquely identify each row.

Then, at step 52, the back-end computer system 20 can determine the quantity (e.g., total count) of rows in each table uniquely identified by the primary keys. Also, at step 53, the back-end computer system 20 can determine the quantity of non-primary keys (sometime denoted "nkcc" herein) in each of the first and second tables. The non-primary key count for a table is the number of attributes (e.g., columns) for the table that are not a primary key. For example, if the table has four columns, and one of the columns is the sole primary key, then nkcc equals three.

The back-end computer system 20 can then analyze the combined table to determine how closely the cell values of the individual cells of the two tables compare. This analysis can include, at step 56, identifying the quantity of rows (as defined by the primary keys) in the first table that not in the second table; and identifying the total quantity of rows (as defined by the primary keys) in the second table that are not in the first table. In that connection, the back-end computer system 20 can then determine, at step 58, the total quantity of rows that are common to both tables and, at step 60, the total quantity of mismatched rows across the two tables. The quantity of common rows determined at step 58 is preferably determined at the cell level across the entire row. The two rows are considered to be in common if they same number of attributes (columns), and the cell values for each attribute are identical. The total quantity of mismatched rows can in turn be computed by the back-end computer system 20 based on the number of common rows as:

(total quantity of rows in 1st table) minus (total quantity of rows in 1st table that are not in 2nd table) minus (total quantity of common rows), which can also equal:

(total quantity of rows in 2nd table) minus (total quantity of rows in 2nd table that are not in 1st table) minus (total quantity of common rows).

Next, at step 61, the back-end computer system 20 can compare the tables (meaning the two tables joined into the combined table), at the cell level, to identify the quantity of mismatched cells between the first and second tables. This comparison can compare both the primary key cell values and the non-primary key cell values. Assume each table has four columns, with one column being the primary key. If a row/tuple in each table have the same primary key (i.e., a common primary key), and three of the four cells in the two rows/tuples match, then the mismatch cell count is one for this common row. Two examples are shown in FIGS. 4A and 4B. FIG. 4A shows two rows (one from each table) and where there are four attributes/columns for each table. In this example, the Attribute 1 is the primary key, for which the cell values in the two rows have a match. The two rows also match in the cell values for Attributes 2 and 3, but have a mismatch for Attribute 4. Thus, the number of mismatched cells for the example of FIG. 4A is one. FIG. 4B shows another example, but in this example, there are mismatches for both Attributes 3 and 4. Thus, the mismatch count for the example of FIG. 4B is two.

This computation can be performed for each mismatched row, with the mismatch cell count across each of the mismatched rows being summed. The mismatched cells for the mismatched rows are also added to the mismatch cell count for the rows in one table that are not in the other to yield a total, overall mismatch cell count. Normally, the number of mismatched cells for a row that is in one table but not in another is equal the number of columns/cells in the row.

At step 62, the back-end computer system 20 can compute a score, e.g., a "pass/fail" score, which is indicative of how closely the tables from the two data source 10, 12 coincide. The following describes one example of how the score can be computed according to various embodiments of the present invention. The score may be computed as a ratio (or percentage by multiplying the ratio by 100). The numerator can be the quantity of cells from the non-primary keys that match (e.g., whose contents or values are equal). Let T represent the total number of cells in the tables (computed as number of rows times number of columns). The numerator can be computed as a first quantity $A$ minus a second quantity B. A can equal (number of common rows+number of mismatched rows) times nkcc times 2. Note that the multiplier 2 can be used because there are two tables. With reference to FIG. 2, the number of common rows is computed at step 58; the number of mismatched rows is computed at step 60; and nkcc is computed at step 53. B can equal the total number of mismatched cells (e.g., computed at step 61) times 2. The numerator can then be computed as $A$ minus B.

The denominator can be the total number of cell present in the two tables from the non-primary keys. The denominator (denoted C) can be computed as:

$C$=knccx((match row countx2)+(mismatch row countx2)+1st table only count+2nd table only count)

The first and second table only counts are determined at step 56. The score at step 62 can then be computed as the ratio of (A+B)/C.

At step 64, the back-encoder computer system 20 can generate an electronic report that shows the results of the comparison/reconciliation. FIG. 3 is an example of such a report. The report can be included, for example, in a webpage served or transmitted to a user or in an attachment emailed to a user. The upper portion 31 of the report can show the file paths for the first and second tables, the number of rows in each table (both have 99 rows in this example), the number of columns ignored in the analysis (none in this example), and the time taken for the comparison (1 minute and 1 second in this example). A middle portion 33 can show relevant data for the comparison, such as: a time stamp for the comparison; the pass percentage (e.g., computed at block 61 of FIG. 2); the file paths for the first and second tables; the number of unique rows (e.g., records or primary keys) in the 1st and 2nd tables (e.g., computed at block 56 of FIG. 2); and the number of common and mismatched rows (e.g., computed at blocks 58 and 60 of FIG. 2).

In various embodiments, the report may also include a portion 35 that provides details about the mismatched rows. In this example, the tables had 4 columns and there were 3 (of the 99 rows) that had mismatches. The example mismatch report portion 35 of FIG. 3 shows the values for each of the cells for these 3 mismatched rows for the 4 columns/attributes of the tables. In the illustrated examples, the tables had the same values for Attributes 1, 2 and 3 for the mismatched rows, but had discrepancies for Attribute 4. The discrepancies can be shown, for example, such as shown in FIG. 3, in brackets, with values separated by a comma, where the first (left) value is the value of the cell in the first table and the second (right) value is the value of the cell in the second table. The mismatch report 35 could also be accessed via a link to a file with the mismatch report. The report may highlight the discrepancies between the two data sources being compared. The file can be a HTIL or XLS file, for example.

It should be noted that the steps depicted in the example of FIG. 2 could be performed in different orders in other embodiments. For example, steps 52-61 could be performed in different orders and/or some or all of the steps could be performed simultaneously.

In various embodiments, the table comparison application 26 can be written in Python/KDB q, for example. To run the Python script which calls KDB q script, the back-end computer system 20 can comprise a Python/KDB q interpreters. In various embodiments, the Python/KDB q script for the table comparison application 26 can be run using a command line interface (CLI) that can be invoked from a computer system with a LINUX operating system, for example. The command may identify, for example, the table comparison application 26 by name, as well as the network locations of the two data sources 10, 12, such as the following example command line instruction:

<Compare script>--leftFile <Location of the left file>--rightFile <Location of the right file>-k<Primary keys>-o<Location where we want to store the output>

In this example, "leftFile" can be considered the first data source; "rightFile" is the second data source; and "Compare script" identifies the table comparison application 26. The command line instruction causes the table comparison application 26 to retrieve the data from the data sources specified in the command and store it in the local RAM 24, and then commence the comparison.

The above embodiments were described generally as comparing one table to another. In some applications and use cases, it may be beneficial or necessary to compare data across multiple tables to one table. In such embodiments, the table comparison application 26 can combine the multiple tables into one table. That way, the one combined table can be performed to the other table as described herein.

Figure 5:
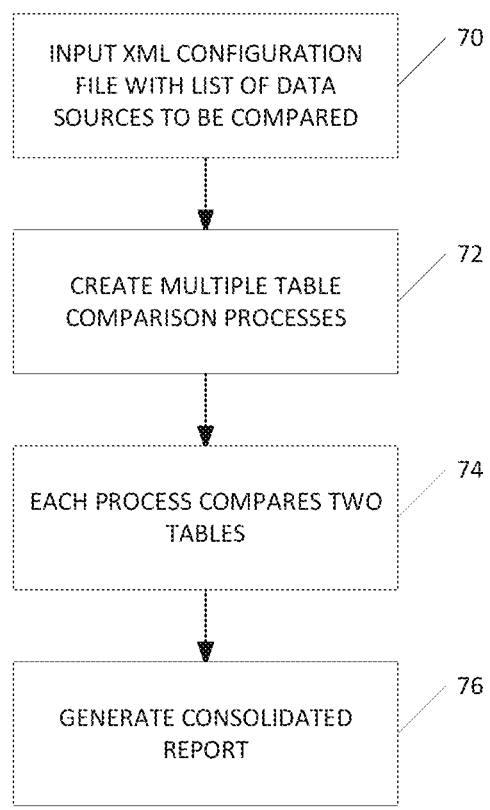
FIG. 5 is flow chart of a process flow performed by the data reconciliation computer system to perform batch comparisons according to various embodiments of the present invention.

The back-end computer 20 can also, in various embodiments, batch compare multiple pairs of tables. FIG. 5 is a diagram of a process that the back-end computer 20 can perform to execute a batch comparison. At step/block 70, a configuration file (e.g., an XML) can be input to the table comparison application 26, where the configuration file identifies the data sources to be compared. The various data sources can be defined in multiple child elements in the XML configuration file, for example. Next, at step 72, the table comparison application 26 can create multiple table comparison processes based on the child elements specified in the configuration file. Next, at step 74, the multiple processes of table comparison application 26 can compare, respectively, the multiple pairs of tables to be compared. In this step, for example, each process can perform steps 50 to 64 of FIG. 2. Then, at step 76, the table comparison application 26 can create a consolidated report that consolidates the reports of each individual process generated at step 74. The table comparison application 26 can send the consolidated report to a user (e.g., via email).

FIG. 6 depicts an example batch comparison report according to various embodiments. In this depicted example, the report comprises an upper table 80 that specifies, for example, the name or file location of the configuration file 82 (see step 70 of FIG. 5). The table 80 can also list: the number of comparisons performed in the batch; the number comparisons that passed (e.g., pass percentage equal to or above a threshold level); the number of comparisons that failed (e.g., pass percentage below the threshold level); the average pass percentage of the for the comparisons; and the total execution time to perform the batch comparisons.

A lower table 84 can include row-by-row results for each of the batch comparisons. The columns of the lower table 84 can include: an ID for the comparison; a description of the comparison; the execution time for the comparison; the row counts for the left and right (or 1st and 2nd) tables; the number of rows only in the left and right (or 1st and 2nd) tables; the number of common rows; the number of mismatched rows; the computed score (e.g., pass percentage); and an error message if applicable.

Various embodiments of the present invention can be used advantageously for large data migration projects that require data reconciliations to be done before moving to newer platforms. For example, assume a user is moving from Sybase to DB2 and wants to compare hundreds of millions of rows at a cell level to check if there are any real issues with the data migration. The output as described above, can highlight the rows where there was single character difference between the two systems.

The back-end computer system 20 may be implemented by one or a number of internetworked computers, such as one or a number of laptops, PCs, servers or mainframes. The back-end computer system 20 may comprise on or more processing cores (e.g., CPU or GPU cores) and one or more computer memory units, such as the RAM 24. The memory may comprise primary (memory directly accessible by the processor, such as RAM, processor registers and/or processor cache) and/or secondary (memory not directly accessible by the processor, such as ROM, flash, HDD, etc.) data storage, to store computer instruction or software to be executed by the processor core(s), such as the table comparison application 26. When the processor core(s) executes the table comparison application 26, the processor core(s) of the back-end computer system 20 performs the data comparison of the two data sources as described herein. The code for the table comparison application 26 may be written in the Python/KDB q programming language, for example, although other programming languages could be used.

The DBC server 22 may be implemented with one or a number of internetworked computers, such as one or a number of servers. The DBC server 22 may comprise one or more processor cores and one or more computer memory units. The memory may comprise primary (memory directly accessible by the processor, such as RAM, processor registers and/or processor cache) and/or secondary (memory not directly accessible by the processor, such as ROM, flash, HDD, etc.) data storage, to store computer instruction or software to be executed by the processor core(s), such as the software for the DBC driver manager 30 and the DBC drivers 32.

The back-end computer system 20, the DBC server 22 and the data sources 10, 12 may be connected and communicate via one or more data networks, such as a LAN, WAN, the Internet, etc.

In various embodiments, the back-end computer system 20 and the DBC server 22 may be integrated into a single computer device. That is, for example, the single computer device may comprise the RAM 24, the table comparison module 26, the DBC driver manager 30 and the DBC driver 32.

In one general aspect, therefore, the present invention is directed to computer systems and computer-implemented methods for reconciling data across first and second data sources. The computer system comprises one or more database connectivity (DBC) drivers for accessing the first and second data sources; and random access memory (RAM) that receives and stores data from each of the first and second data sources accessed by the one or more DBC drivers. Data from the first data source are stored in a first table in the RAM and data from the second data source are stored in a second table in the RAM. The computer system also comprises a processor in communication with the RAM. The processor is configured to compare the data in the first and second tables by identifying a set of primary keys across the first and second tables, where the set of primary keys are a set of one or more columns in the both first and second tables that uniquely identify rows across both the first and second tables. The process also compares the data in the first and second tables by: determining, based on the identified set of primary keys, a total number of mismatched cell values across the first and second tables; and computing a score for the comparison of the first and second tables, wherein the score is computed based on the total number of mismatched cell values. Also the processor generates an electronic comparison report based on the comparing of the first table and second table.

In various implementations, the processor is programmed to determine the total of number of mismatched cell values across the first and second tables by: determining a total count of rows in each of the first and second tables, wherein the rows in the first and second tables are defined by the identified set of primary keys; determining a total count of rows in the first table that do not correspond to any row of the second table; determining a total count of rows of the second table that do not correspond to any row of the first table; determining a total count of rows that are common to both the first table and the second table; determining a total count of mismatched rows across the first and second tables; and determining the total number of mismatched cell values across the first and second tables by comparing cell values of the first table to cell values of the second table.

In various implementations, the processor is programmed to determine the total number of mismatched cell values across the first and second tables through comparing cell values of the first table to cell values of the second table by summing: a number of mismatched cell values across all of the mismatched rows; a number of cells in the first table that do not correspond to any row of the second table; and a number of cells in the second table that do not correspond to any row of the first table.

In various implementations, the processor is programmed to determine the total count of mismatched rows across the first and second tables by subtracting from the total count of rows in the first table (i) the total count of rows in the first table that are not in the second table and (ii) the total count of rows that are common to both the first and second table.

In various implementations, the first data source comprises a first database in a first database management system. In various implementations, the second data source comprises a second database in the first database management system. In various implementations, the second data source comprises a second database in a second database management system. In various implementations, the second data source comprises a delimited file.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for reconciling data across first and second data sources, the computer system comprising:
one or more database connectivity (DBC) drivers for accessing the first and second data sources; and
a data reconciliation computer system that comprises:
 a processor; and
 random access memory (RAM) that is local to the processor, wherein the RAM receives and stores data from each of the first and second data sources accessed by the one or more DBC drivers, wherein data from the first data source are stored in a first table in the RAM and data from the second data source are stored in a second table in the RAM; and
 wherein the processor compares data in the first and second tables, wherein the processor is programmed to compare the data by:
  unioning the first and second tables to form a unioned table, wherein the unioned table unions the data of the first and second tables and a set of primary keys of the first and second tables;
  identifying based on the unioned table the set of primary keys across the first and second tables, wherein the set of primary keys are a set of one or more columns in the both first and second tables that uniquely identify rows across both the first and second tables;
  comparing, in the unioned table, the data in the first and second tables, wherein comparing the first and second tables comprises:
   determining, based on the identified set of primary keys in the unioned table, a total number of mismatched cell values across the first and second tables by:
    determining a total count of rows in each of the first and second tables, wherein the rows in the first and second tables are defined by the identified set of primary keys;
    determining a total count of rows in the first table that do not correspond to any row of the second table;
    determining a total count of rows of the second table that do not correspond to any row of the first table;
    determining a total count of rows that are common to both the first table and the second table;
    determining a total count of mismatched rows across the first and second tables; and
    determining the total number of mismatched cell values across the first and second tables by comparing cell values of the first table to cell values of the second table by summing;
     a number of mismatched cell values across all of the mismatched rows:
     a number of cells in the first table that do not correspond to any row of the second table; and
     a number of cells in the second table that do not correspond to any row of the first table; and
   computing a score for the comparison of the first and second tables, wherein the score is computed based on the total number of mismatched cell values; and
  generating an electronic comparison report based on the comparing of the first table and second table.

2. The computer system of claim 1, wherein the processor is programmed to determine the total count of mismatched rows across the first and second tables by subtracting from the total count of rows in the first table (i) the total count of rows in the first table that are not in the second table and (ii) the total count of rows that are common to both the first and second table.

3. The computer system of claim 1, wherein the first data source comprises a first database in a first database management system.

4. The computer system of claim 3, wherein the second data source comprises a second database in the first database management system.

5. The computer system of claim 3, wherein the second data source comprises a second database in a second database management system.

6. The computer system of claim 3, wherein the second data source comprises a delimited file.

7. The computer system of claim 1, wherein the data reconciliation computer system comprises a high-speed data bus connection the processor and the RAM.

8. The computer system of claim 1, wherein:
the processor is programmed with data reconciliation software that, when executed by the processor, causes the processor to compares data in the first and second tables; and
the data reconciliation software comprises a KDB q script.

9. The computer system of claim 8, wherein the data reconciliation software is invokable via a command line interface.

10. A computer-implemented method for reconciling data across first and second data sources, the method comprising:
accessing, with one or more database connectivity (DBC) drivers, the first and second data sources;
storing, in local random access memory (RAM) of a data reconciliation computer system, data from each of the first and second data sources accessed by the one or more DBC drivers, wherein data from the first data source are stored in a first table in the RAM and data from the second data source are stored in a second table in the RAM, and wherein the RAM is local to a processor of the data reconciliation computer system; and
comparing, by the processor that is in communication with the RAM, the data, wherein comparing the data comprises:
unioning the first and second tables to form a unioned table, wherein the unioned table unions the data of the first and second tables and a set of primary keys of the first and second tables;
identifying based on the unioned table the set of primary keys across the first and second tables, wherein the set of primary keys are a set of one or more columns in the both first and second tables that uniquely identify rows across both the first and second tables;
comparing, in the unioned table, the data in the first and second tables, wherein comparing the first and second tables comprises:
determining, based on the identified set of primary keys in the unioned table, a total number of mismatched cell values across the first and second tables, wherein determining the total number of mismatched cell values comprises:
determining a total count of rows in each of the first and second tables, wherein the rows in the first and second tables are defined by the identified set of primary keys;
determining a total count of rows in the first table that do not correspond to any row of the second table;
determining a total count of rows of the second table that do not correspond to any row of the first table;
determining a total count of rows that are common to both the first table and the second table;
determining a total count of mismatched rows across the first and second tables; and
determining the total number of mismatched cell values across the first and second tables by comparing cell values of the first table to cell values of the second table, wherein comparing the cell values of the first table to cell values of the second table comprises summing:
a number of mismatched cell values across all of the mismatched rows;
a number of cells in the first table that do not correspond to any row of the second table; and
a number of cells in the second table that do not correspond to any row of the first table; and
computing a score for the comparison of the first and second tables, wherein the score is computed based on the total number of mismatched cell values; and
generating an electronic comparison report based on the comparing of the first table and second table.

11. The computer-implemented method of claim 10, wherein determining the total count of mismatched rows across the first and second tables comprises subtracting from the total count of rows in the first table (i) the total count of rows in the first table that are not in the second table and (ii) the total count of rows that are common to both the first and second table.

12. The computer-implemented method of claim 10, wherein the first data source comprises a first database in a first database management system.

13. The computer-implemented method of claim 12, wherein the second data source comprises a second database in the first database management system.

14. The computer-implemented method of claim 12, wherein the second data source comprises a second database in a second database management system.

15. The computer-implemented method of claim 12, wherein the second data source comprises a delimited file.

16. The computer-implemented method of claim 10, wherein the data reconciliation computer system comprises a high-speed data bus connection the processor and the RAM.

17. The computer-implemented method of claim 10, wherein:
the processor is programmed with data reconciliation software that, when executed by the processor, causes the processor to compares data in the first and second tables; and
the data reconciliation software comprises a KDB q script.

18. The computer-implemented method of claim 17, wherein the data reconciliation software is invokable via a command line interface.

* * * * *